Dec. 4, 1951     K. E. STOBER     2,576,977
METHOD OF MAKING FREE-FLOWING CELLULAR
PELLETS OF THERMOPLASTIC RESINS
Filed Feb. 10, 1949

INVENTOR.
Kenneth E. Stober
BY
Griswold & Burdick
ATTORNEYS

Patented Dec. 4, 1951

2,576,977

UNITED STATES PATENT OFFICE 2,576,977

METHOD OF MAKING FREE-FLOWING CELLULAR PELLETS OF THERMOPLASTIC RESINS

Kenneth E. Stober, Midland, Mich., assignor to The Dow Chemical Company, Midland, Mich., a corporation of Delaware Application February 10, 1949, Serial No. 75,556

11 Claims. (Cl. 18—47.5)

This invention concerns an improved method for making free-flowing cellular pellets of thermoplastic resins. It relates more particularly to the production of free-flowing cellular pellets of expanded thermoplastic resins from a mobile gel comprising a thermoplastic resin and a normally gaseous agent.

It is known to prepare cellular products of thermoplastic resins by causing a mobile gel consisting of a thermoplastic resin, e. g. polystyrene, having a normally gaseous agent such as methyl chloride, methyl ether, ethyl ether or the like dissolved therein under pressure, to flow from a pressurizing chamber through a valve or passageway to a zone of lower pressure. Upon release of the pressure the normally gaseous agent vaporizes and expands the resin to form a stable cellular body. The cellular thermoplastic resin product thus prepared is useful as insulating material, e. g. in the manufacture of cold boxes, refrigerators, etc., and may be sawn or cut into boards, blocks, panels, etc. The cellular product may also be ground, broken, shredded or otherwise reduced to small particles, so as to be blown or poured into confined chambers or into difficultly accessible spaces such as the walls of buildings or of cold storage chambers. However, when the cellular product is so reduced to small fragments, it consists of irregular shaped particles composed of individual thin-walled cells with an outer ragged surface of broken cells. Such cellular particles are easily crushed or broken. They cannot readily be poured through small openings into containers or into confined chambers since the irregular rough surfaces of the broken cells cause the particles to cling together.

I have now found that stable free-flowing cellular pellets of expanded thermoplastic resins can be prepared by procedure which involves causing a mobile gel composed of a thermoplastic resin having a normally gaseous agent dissolved therein under pressure to flow from a pressurizing chamber through one or more constricted passageways or die openings to a zone of lower pressure, cutting of the extruding mobile gel into segments or globules before substantial expansion occurs and thereafter completing expansion of the globules of resinous gel.

Substantially spherical cellular pellets of thermoplastic resins can be made by timing the speed of the cutting device with the linear rate of extrusion of the mobile gel through a circular contricted passageway in such manner that the flow of extruding gel is cut into segments or globules, before substantial expansion occurs, which segments have a length approximately equal to the diameter of the passageway and causing the segments or globules of resinous gel to fall freely through the air or other gaseous medium while completing the expansion. When the extruding mobile gel is cut into lengths substantially greater than, or less than, the diameter of the passageway, the expanded cellular thermoplastic resin product is usually of egg-shaped or cylindrical form. Egg-shaped cellular granules may also be obtained by extruding the gel through a non-circular, e. g. an oval, orifice and cutting the extruding stream into pellets during expansion of the same.

The density and resistance to breaking and crushing of the cellular thermoplastic resin pellets is dependent upon the degree to which the mobile resinous gel is expanded by vaporization of the normally gaseous agent upon release of the pressure. In general, the degree to which the mobile resinous gel is expanded is, in turn, dependent upon the proportion of the normally gaseous agent dissolved in the resin and also upon the temperature of the mobile gel just prior to release of the pressure, e. g. by extrusion into a zone of lower pressure. Thus, by regulating the proportion of normally gaseous agent used, based on the weight of the thermoplastic resin and controlling the temperature of the mobile resinous gel while extruding the same, the mobile gel can be extruded through a die into a zone of lower pressure and cut into segments before substantial expansion occurs and the segments of gel expanded so as to form stable free-flowing cellular resin pellets of low density.

The products obtained by the method of this invention are non-tacky free-flowing cellular pellets of an expanded thermoplastic resin, consisting for the most part, of spheres and ovoids having a cellular inner mass of individual thin-walled cells with a continuous outer thermoplstic resin skin. The cellular resin pellets are resistant to crushing and breaking. The product by virtue of its low density and unit cell structure has excellent heat insulating properties. It is resistant to penetration by water and is extremely bouyant. It can readily be poured through small openings into confined and difficultly accessible spaces such as the walls of buildings, refrigerators or cold boxes, and used as insulating material to prevent rapid transfer of heat. It may also be used to fill containers such as life rafts, life jackets, floats, etc., where a high degree of buoyancy is desirable.

The accompanying drawing shows an arrangement of apparatus suitable for use in practice of the invention. The apparatus in its important parts comprises a valve with a threaded or flanged opening on the feed side for attaching the same to a pressurizing chamber and has a perforated die plate on the discharge side, a rotatable knife mounted to shear across the face of the perforated die plate, and means for driving the rotatable knife at a controlled speed of rotation.

Referring now to the drawing.

Figure 1:
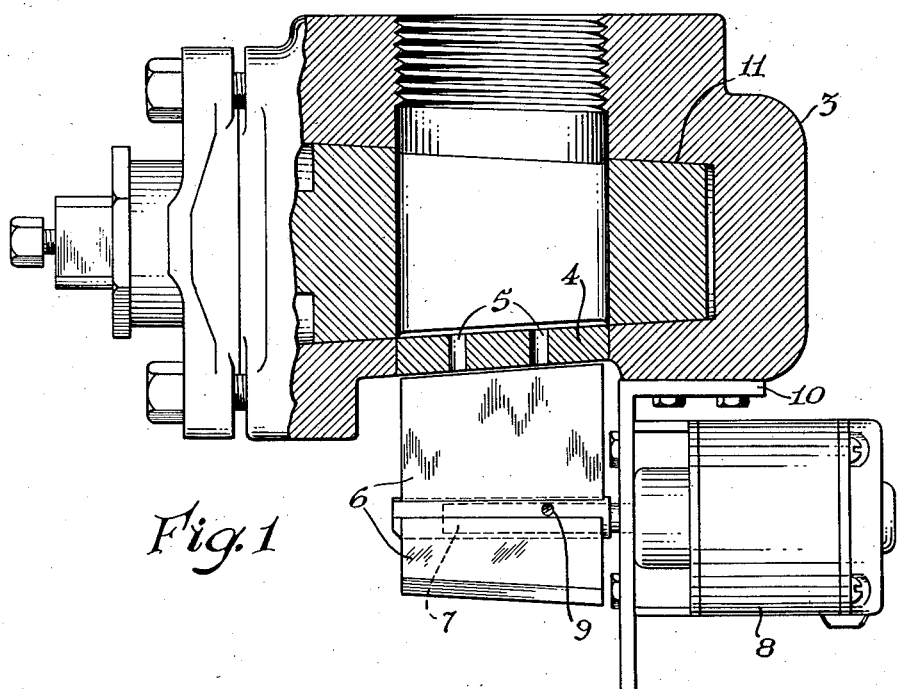
Fig. 1 is a schematic view of the apparatus partly in section.
Figure 2:
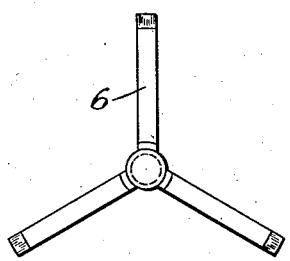
Fig. 2 is an end view of the rotating knife.

In the drawing, a plugcock valve has been modified by machining away a part of one side of the valve body 3 and providing a die plate 4, containing circular openings or drill holes 5 on the discharge side of the valve. The plate 4 is welded to the valve body 3 and is an integral part thereof. A rotating knife 6 is fastened to the shaft 7 of a gear assembly 8 by means of a set screw 9 or by a key or equivalent means. The rotating knife may consist of a single blade or multiple blades may be used, as shown. The gear assembly 8 is attached to support 10 by bolts or by other suitable means and is movable thereon to adjust the rotating knife so that the blades shear cleanly across the constricted passageways or openings 5, in the plate 4. The support 10 is, in turn, attached to the valve body 3 by any suitable means, e. g. by bolts. The gear assembly 8 is preferably a variable speed gear assembly which is easily controlled to regulate the speed of the shaft 7. The gear assembly may be actuated by any suitable means such as an electric motor, not shown. The plugcock 11 may be opened to permit the mobile gel to flow through the openings 5 in plate 4 or it may be closed to stop the process.

The method of this invention may be employed to produce substantially spherical free-flowing cellular pellets from the solid thermoplastic resinous benzene-soluble polymers and copolymers of monovinyl-aromatic compounds having the vinyl group attached directly to a carbon atom of the aromatic nucleus. Examples of such monovinyl-aromatic compounds are styrene, meta-ethylstyrene, meta - chlorostyrene, methylstyrene, para-isopropylstyrene, ortho-chlorostyrene and alpha-methylstyrene. The method may also be used to produce free-flowing cellular pellets from other normally solid thermoplastic resins such as polymethylmethacrylate and copolymers of vinyl chloride and vinyl acetate or copolymers of methylmethacrylate and styrene, etc.

The normally gaseous agents to be used in preparing the expanded cellular thermoplastic resin pellets should be soluble or at least partially soluble in the thermoplastic resins, under the conditions of temperature and pressure employed in carrying out the process. Such normally gaseous agents are preferably a gas at ordinary temperatures. Examples of normally gaseous agents suitable for use in the process are methyl chloride, methyl ether, ethyl ether, methylethyl ether, ethyl chloride, methyl bromide, dichloro-difluoromethane and normally gaseous olefines such as propylene or butylene. Cracked-oil gas fractions containing such gaseous olefines as the principal components may also be used.

The mobile gel may be prepared by placing the thermoplastic resin, e. g. polystyrene, preferably in a ground or powdered form, in a pressure resistant vessel, adding thereto a normally gaseous agent such as methyl chloride, methyl ether, propylene, butylene, etc., and maintaining the mixture under pressure until a homogeneous mobile gel is formed. It is preferred that the amount of normally gaseous agent dissolved in the thermoplastic resin be just sufficient to expand the resin and form a cellular product consisting of uniform small cells and that the normally gaseous agent be substantially completely vaporized upon release of the pressure and expansion of the resin to a volume of from 25 to 40 times the volume of the mobile gel. The normally gaseous agent is usually employed in amounts of from 10 to 25 per cent by weight of the thermoplastic resin used.

The mobile resinous gel under pressure may be extruded into a zone of lower pressure while the gel is at a temperature of from 60° C. to 120° C., preferably from 90° to 110° C., just prior to extruding the same. The extrusion is usually carried out under the vapor pressure of the normally gaseous agent used, although higher pressures may be employed. Such increased pressure may be obtained by adding carbon dioxide, air, nitrogen or the like to the pressurizing chamber containing the resinous gel.

Other ways of providing additional pressure to force the mobile gel through the constricted passageway may be employed instead of those explained. For instance, a gear pump may be employed to withdraw the mobile gel from a pressurized storage vessel and force it under a greater pressure through a die containing one or more constricted passageways, in such manner as to maintain at least a portion of the normally gaseous agent as a solution in the thermoplastic resin until the pressure is released by flow of the mobile gel through the constricted passageways into a zone of lower pressure.

Changes in composition of the thermoplastic resin employed, the normally gaseous agent used, and in the operating conditions will result in slight variations in the rate of extrusion. In order that the size or length of the severed globules or segments of mobile gel may be regulated at will and especially, that expanded spheres of equal size may be obtained regardless of the rate of extrusion, the rotating knife is actuated by an easily controlled means such as an electric motor driving a variable speed gear assembly. The knife blades, when arranged as indicated in the drawing, cut the gel stream largely by a shearing action. The speed of the knife is manually adjusted to cut the extruding resinous gel into segments or globules of a desired size such as to form substantially spherical cellular thermoplastic resin pellets for a given rate of extrusion. The mobile resinous gel flowing from the die opening is usually cut into segments or globules having a length of from 0.5 to 2, preferably from 0.75 to 1.5 times the diameter of the die opening.

The size of the expanded cellular resin pellets can be varied by changing the size of the constricted passageway or opening in the die through which the resinous gel is extruded. To obtain free-flowing cellular thermoplastic resin spheres of from $\frac{1}{16}$ inch to $\frac{7}{8}$ inch diameter, the mobile gel is extruded through one or more circular ducts of from $\frac{1}{16}$ inch to $\frac{1}{8}$ inch diameter and cut into segments of approximately similar length, before substantial expansion occurs. Larger openings, e. g. of from $\frac{1}{2}$ inch to $\frac{3}{4}$ inch diameter, may be employed to make cellular thermoplastic resin balls having a diameter of from 1½ to 3 inches. The number of openings in the die plate may be varied. It is of advantage in making small pellets to use a die having more than one opening.

Expansion of the globules of mobile gel is usually accomplished by permitting the segments or globules of gel to fall freely through the air at room temperature or thereabout, or through air or other inert gaseous medium, e. g. nitrogen or carbon dioxide, heated to a temperature of from 40° to 80° C., to rapidly vaporize the normally gaseous agent dissolved in the globules of resinous gel and complete the expansion.

The following example illustrates practice of the invention, but is not to be construed as limiting the scope thereof.

*Example*

An apparatus, having the essential parts described herein and shown in the drawing, consisting of a one-half inch iron plugcock valve having on the discharge side a plate containing two 1/16 inch diameter drill holes, was attached to the bottom of a jacketed pressure-resistant vessel of approximately 7 gallons capacity. A mobile gel was prepared by placing 100 parts by weight of granular polystyrene in the vessel, adding thereto 15 parts of methyl chloride under pressure and heating the mixture at a temperature of 95° C., for 16 hours. The plugcock was then opened and the mobile gel permitted to flow from the vessel under the vapor pressure of the methyl chloride, through the drill holes, to atmospheric pressure. The speed of the rotating knife was adjusted so as to cut the extruding plastic gel into cylinders or globules having a length approximately equal to the diameter of the drill holes. The segments of resinous gel were allowed to fall freely through the air at room temperature for a distance of about 3 feet while expanding. The product consisted of substantially uniform cellular spheres of expanded polystyrene. The cellular spheres were approximately ¼ inch in diameter. They were free-flowing cellular bodies consisting of an inner mass of individual cells with a thin outer continuous resinous skin.

Lubricants or mold release agents such as stearic acid, soya oil, corn oil, lard oil, butyl stearate, etc., may initially be added to the mixture of thermoplastic resin and normally gaseous agent, in amounts of from 0.2 to 2 per cent by weight of the thermoplastic resin used, to aid in extruding the mobile gel and in cutting the same into globules or segments.

Prior to extrusion of the gel, solid substances such as finely divided carbon, aluminum powder, titanium dioxide, fullers earth, powdered calcium, silicate, clay, etc., may be incorporated in the resinous mixture as fillers, binders, pigments, etc., in a total amount corresponding to from 0.2 to 5 percent by weight of the resin used.

Other ingredients such as barium stearate, calcium stearate, lead stearate, or zinc stearate, which stearates have the effect of retarding the rate of expansion of the gel upon release of the pressure as disclosed in copending application Serial No. 56,063, filed October 22, 1948 by C. E. De Long, may advantageously be included in the mixture of thermoplastic resin and normally gaseous agent, in amount corresponding to from 0.04 to 1 per cent by weight of the resin component, together with a lubricant and a pigment.

Other modes of applying the principle of my invention may be employed instead of those explained, change being made as regards the method or products herein disclosed, provided the steps or products stated in any of the following claims or the equivalent of such stated steps or products be employed.

I claim:

1. A method of making free-flowing cellular pellets of a thermoplastic resin which comprises extruding, at temperatures between 60° and 120° C., a mobile gel consisting of a thermoplastic resin having a normally gaseous agent dissolved therein under pressure through a constricted passageway to a zone of lower pressure, cutting the extruding plastic gel into segments before complete expansion occurs and thereafter causing the severed pieces to fall freely through the air while completing the expansion.

2. A method of making free-flowing cellular pellets of a thermoplastic resin which comprises extruding, at temperatures between 60° and 120° C., a mobile gel consisting of an intimate mixture of a thermoplastic resin having a normally gaseous agent dissolved therein under pressure and from 0.04 to 1 per cent of an expansion retarder selected from the group consisting of barium stearate, calcium stearate, lead stearate and zinc stearate, based on the weight of the resin, through a constricted passageway to atmospheric pressure, cutting the extruding plastic gel into segments before substantial expansion occurs and causing the severed pieces to fall freely through the air while completing the expansion.

3. A method of making free-flowing cellular pellets of a thermoplastic resin which comprises extruding, at temperatures of from 90° to 110° C., a mobile gel consisting of an intimate mixture of a thermoplastic resin having from 10 to 25 per cent by weight of a normally gaseous agent dissolved therein under pressure and from 0.04 to 1 per cent of an expansion retarder selected from the group consisting of barium stearate, calcium stearate, lead stearate and zinc stearate, based on the weight of the resin, through a constricted passageway to atmospheric pressure, cutting the extruding plastic gel into segments before substantial expansion occurs and thereafter permitting the pieces of resinous gel to fall freely through air while completing the expansion.

4. A method of making free-flowing cellular pellets of polystyrene which comprises extruding, at temperatures between 60° and 120° C., a mobile gel consisting of an intimate mixture of polystyrene having from 10 to 25 per cent by weight of a normally gaseous agent dissolved therein under pressure and from 0.04 to 1 per cent of an expansion retarder selected from the group consisting of barium stearate, calcium stearate, lead stearate and zinc stearate, based on the weight of the polystyrene, through a constricted passageway to atmospheric pressure, cutting the extruding plastic gel into segments before substantial expansion occurs and permitting the severed pieces to fall freely through the air while completing the expansion.

5. A method of making free-flowing cellular pellets of polystyrene which comprises extruding, at temperatures between 60° and 120° C., a mobile gel consisting of an intimate mixture of polystyrene having from 10 to 25 per cent by weight of a normally gaseous agent dissolved therein under pressure and from 0.04 to 1 per cent of an expansion retarder selected from the group consisting of barium stearate, calcium stearate, lead stearate and zinc stearate, based on the weight of the polystyrene, through a constricted passageway to atmospheric pressure, cutting the extruding plastic gel into segments before substantial expansion occurs and causing the severed pieces to fall freely through air maintained at a temperature of from 40° to 80° C. while completing the expansion.

6. A method of making pigmented free-flowing cellular pellets of polystyrene which comprises extruding, at temperatures between 90° and 110° C., a pigmented mobile gel consisting of an intimate mixture of polystyrene having from 10 to 25 per cent by weight of a normally gaseous agent dissolved therein under pressure, a pigment and from 0.04 to 1 per cent of an expansion retarder selected from the group consisting of barium stearate, calcium stearate, lead stearate and zinc stearate, based on the weight of the polystyrene, through a constricted passageway to atmospheric pressure, cutting the extruding plastic gel into segments before substantial expansion occurs and permitting the severed pieces to fall freely through the air while completing the expansion.

7. A method of making free-flowing cellular pellets of polystyrene which comprises extruding, at temperatures between 90° and 110° C., a mobile gel consisting of an intimate mixture of polystyrene having from 10 to 25 per cent by weight of methyl chloride dissolved therein under pressure and from 0.04 to 1 per cent of an expansion retarder selected from the group consisting of barium stearate, calcium stearate, lead stearate and zinc stearate, based on the weight of the polystyrene, through a constricted passageway to atmospheric pressure, cutting the extruding plastic gel into segments before substantial expansion occurs and permitting the severed pieces to fall freely through the air while completing the expansion.

8. A method of making pigmented free-flowing cellular polystyrene pellets which comprises causing a mobile gel composed of polystyrene, from 0.2 to 2 per cent by weight of a lubricant, from 0.2 to 5 per cent of a pigment, from 0.04 to 1 per cent of an expansion retarder selected from the group consisting of barium stearate, calcium stearate, lead stearate and zinc stearate, and from 10 to 25 per cent of a normally gaseous agent under pressure to flow at a temperature of from 90° to 110° C., from a pressurizing chamber through a constricted passageway to atmospheric pressure, cutting the plastic gel flowing from the constricted passageway into segments before complete expansion occurs and causing the severed pieces to fall freely through the air while completing the expansion.

9. A method of making free-flowing cellular pellets of a thermoplastic resin which comprises extruding, at a temperature of from 60° to 120° C., a mobile gel consisting of an intimate mixture of a thermoplastic resin having from 10 to 25 per cent by weight of a normally gaseous agent dissolved therein under pressure and from 0.04 to 1 per cent of an expansion retarder selected from the group consisting of barium stearate, calcium stearate, lead stearate and zinc stearate, based on the weight of the resin, through a die containing a number of passageways having a diameter of from $\frac{1}{16}$ to $\frac{1}{8}$ inch to atmospheric pressure, cutting the mobile gel flowing from the passageways into segments having a length of from 0.5 to 2 times the diameter of the passageway and thereafter permitting the segments of plastic gel to fall freely through the air at room temperature while completing the expansion.

10. A method of making free-flowing cellular pellets of a thermoplastic resin which comprises causing a mobile gel consisting of an intimate mixture of a thermoplastic resin having from 10 to 25 per cent by weight of a normally gaseous agent dissolved therein under pressure and from 0.04 to 1 per cent of an expansion retarder selected from the group consisting of barium stearate, calcium stearate, lead stearate and zinc stearate, based on the weight of the resin, to flow at a temperature of from 90° to 110° C., through a die containing one or more circular openings having a diameter of from $\frac{1}{16}$ to $\frac{1}{8}$ inch to atmospheric pressure, cutting the extruding plastic gel into segments having a length of from 0.5 to 2 times the diameter of the die openings and thereafter causing the segments of plastic gel to fall freely through air maintained at a temperature of from 40° to 80° C. while completing the expansion.

11. A method of making free-flowing pellets of cellular polystyrene which comprises causing a mobile gel consisting of an intimate mixture of polystyrene having from 10 to 25 per cent by weight of methyl chloride dissolved therein under pressure and from 0.04 to 1 per cent of an expansion retarder selected from the group consisting of barium stearate, calcium stearate, lead stearate and zinc stearate, based on the weight of the polystyrene, to flow at a temperature of from 90° to 110° C., from a pressurizing chamber through a die having a number of circular openings of from $\frac{1}{16}$ to $\frac{1}{8}$ inch diameter to atmospheric pressure, cutting the mobile gel flowing from the die openings into segments having a length approximately equal to the diameter of the die openings and thereafter causing the segments of mobile gel to fall freely through air maintained at a temperature of from 40° to 80° C. while completing the expansion.

KENNETH E. STOBER.

REFERENCES CITED

The following references are of record in the file of this patent:

UNITED STATES PATENTS

| Number | Name | Date |
|---|---|---|
| 1,601,898 | Wiley et al. | Oct. 5, 1926 |
| 2,023,204 | Munters | Dec. 3, 1935 |
| 2,331,572 | Scherer | Oct. 12, 1943 |
| 2,450,436 | McIntire | Oct. 5, 1948 |